(12) United States Patent
Puthoor et al.

(10) Patent No.: US 9,898,287 B2
(45) Date of Patent: Feb. 20, 2018

(54) DYNAMIC WAVEFRONT CREATION FOR PROCESSING UNITS USING A HYBRID COMPACTOR

(71) Applicant: Advanced Micro Devices, Inc., Sunnyvale, CA (US)

(72) Inventors: Sooraj Puthoor, Austin, TX (US); Bradford M. Beckmann, Bellevue, WA (US); Dmitri Yudanov, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 315 days.

(21) Appl. No.: 14/682,971

(22) Filed: Apr. 9, 2015

(65) Prior Publication Data
US 2016/0239302 A1    Aug. 18, 2016

Related U.S. Application Data

(60) Provisional application No. 62/116,001, filed on Feb. 13, 2015.

(51) Int. Cl.
*G06F 9/38* (2006.01)
*G06F 9/30* (2018.01)
*G06F 9/46* (2006.01)

(52) U.S. Cl.
CPC ........ *G06F 9/30058* (2013.01); *G06F 9/3804* (2013.01); *G06F 9/3851* (2013.01); *G06F 9/3887* (2013.01); *G06F 9/46* (2013.01)

(58) Field of Classification Search
CPC .............................. G06F 9/3851; G06F 9/3887
See application file for complete search history.

(56) References Cited

U.S. PATENT DOCUMENTS

| 2011/0022825 A1* | 1/2011 | Spackman | G06F 3/0608 712/240 |
| 2011/0219221 A1* | 9/2011 | Skadron | G06F 9/3851 712/235 |

(Continued)

OTHER PUBLICATIONS

W. Fung et al. Dynamic Warp Formation and Scheduling for Efficient GPU Control Flow. In Proc. 40$^{th}$ IEEE/ACM International Symposium on Microarchitecture, 2007.*

(Continued)

*Primary Examiner* — Andrew Caldwell
*Assistant Examiner* — Michael Metzger
(74) *Attorney, Agent, or Firm* — Volpe and Koenig, P.C.

(57) ABSTRACT

A method, a non-transitory computer readable medium, and a processor for repacking dynamic wavefronts during program code execution on a processing unit, each dynamic wavefront including multiple threads are presented. If a branch instruction is detected, a determination is made whether all wavefronts following a same control path in the program code have reached a compaction point, which is the branch instruction. If no branch instruction is detected in executing the program code, a determination is made whether all wavefronts following the same control path have reached a reconvergence point, which is a beginning of a program code segment to be executed by both a taken branch and a not taken branch from a previous branch instruction. The dynamic wavefronts are repacked with all threads that follow the same control path, if all wavefronts following the same control path have reached the branch instruction or the reconvergence point.

14 Claims, 7 Drawing Sheets

(56) References Cited

U.S. PATENT DOCUMENTS

| | | | | |
|---|---|---|---|---|
| 2013/0061027 A1* | 3/2013 | Chen | .................... | G06F 9/3887 |
| | | | | 712/234 |
| 2014/0075160 A1* | 3/2014 | Jones | .................... | G06F 9/522 |
| | | | | 712/220 |
| 2014/0165049 A1* | 6/2014 | Diamos | .................. | G06F 8/443 |
| | | | | 717/156 |

OTHER PUBLICATIONS

Fung et al., "Dynamic Warp Formation: Efficient MIMD Control Flow on SIMD Graphics Hardware," ACM Transactions on Architecture and Code Optimization, vol. 6, No. 2, Article 7, Published Jun. 2009.

Fung et al., "Thread Block Compaction for Efficient SIMT Control Flow," HPCA-17, 2011.

Vaidya et al., "SIMD Divergence Optimization through Intra-Warp Compaction," ISCA '13 Tel-Aviv, Israel Copyright 2013 ACM 978-1-4503-2079—May 13, 2006.

* cited by examiner

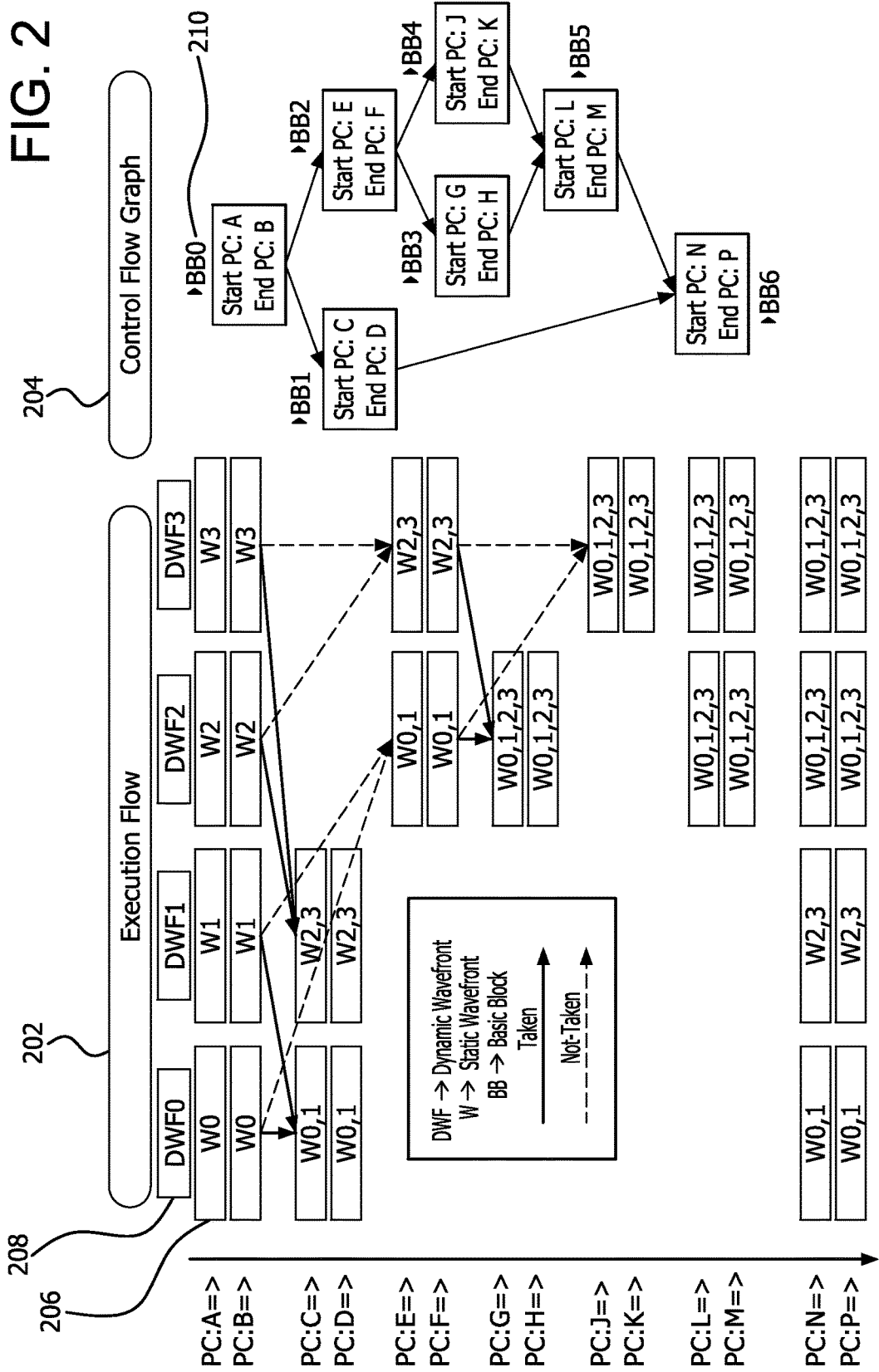

DYNAMIC WAVEFRONT CREATION FOR PROCESSING UNITS USING A HYBRID COMPACTOR

CROSS REFERENCE TO RELATED APPLICATIONS

This application claims the benefit of U.S. Provisional Patent Application No. 62/116,001 filed Feb. 13, 2015, the contents of which are hereby incorporated by reference herein.

STATEMENT REGARDING FEDERALLY SPONSORED RESEARCH OR DEVELOPMENT

This invention was made with government support under Prime Contract Number DE-AC52-07NA27344, Subcontract Number B600716 awarded by the Department of Energy (DOE). The government has certain rights in the invention.

TECHNICAL FIELD

The disclosed embodiments are generally directed to graphics processing units (GPUs), and in particular, to dynamically creating wavefronts of execution threads in a GPU.

BACKGROUND

Current graphics processing units (GPUs) issue and execute groups of threads called a "wavefront." GPU architectures issue wavefronts of a constant, fixed size that depends on the GPU hardware's microarchitecture. In some implementations, a wavefront is a group of 64 threads, which are issued in groups of 16 threads through a 16 thread wide single instruction, multiple data (SIMD) unit over four cycles. In many cases, all 64 threads are executing.

To maximize the throughput of the GPU, it is beneficial to execute full wavefronts, meaning that all threads of a wavefront are active. With branching instructions, all threads of a wavefront may not follow the same branch (i.e., taken or not taken). In such circumstances, different wavefronts may be "repacked" so that all of the threads of a wavefront follow the same branch direction.

SUMMARY OF EMBODIMENTS

Some embodiments provide a method for repacking dynamic wavefronts during program code execution on a processing unit, each dynamic wavefront including multiple threads. If a branch instruction is detected, a determination is made whether all wavefronts following a same control path in the program code have reached a compaction point, which is the branch instruction. If no branch instruction is detected in executing the program code, a determination is made whether all wavefronts following the same control path have reached a reconvergence point, which is a beginning of a program code segment to be executed by both a taken branch and a not taken branch from a previous branch instruction. The dynamic wavefronts are repacked with all threads that follow the same control path, if all wavefronts following the same control path have reached the branch instruction or the reconvergence point.

Some embodiments provide a non-transitory computer-readable storage medium storing a set of instructions for execution by a general purpose computer to repack dynamic wavefronts during program code execution on a processing unit, each dynamic wavefront including multiple threads. The set of instructions includes a first determining code segment, a second determining code segment, and a repacking code segment. The first determining code segment determines whether all wavefronts following a same control path in the program code have reached a compaction point, wherein the compaction point is a branch instruction, if a branch instruction is detected in executing the program code. The second determining code segment determines whether all wavefronts following the same control path in the program code have reached a reconvergence point, wherein the reconvergence point is a beginning of a program code segment to be executed by both a taken branch and a not taken branch from a previous branch instruction, if no branch instruction is detected in executing program code. The repacking code segment repacks the dynamic wavefronts with all threads that follow the same control path in the program code, if all wavefronts following the same control path have reached the branch instruction or the reconvergence point.

Some embodiments provide a processor configured to repack dynamic wavefronts during program code execution on a processing unit, each dynamic wavefront including multiple threads. The processor includes a compaction table, a reconvergence stack for each wavefront, and a reconvergence table. The compaction table is configured to store compaction point information, wherein the compaction point is a branch instruction. Each reconvergence stack is configured to store compaction point information for the corresponding wavefront. The reconvergence table is configured to store reconvergence point information, wherein the reconvergence point is a beginning of a program code segment to be executed by both a taken branch and a not taken branch from a previous branch instruction.

The processor is configured to determine whether all wavefronts following a same control path in the program code have reached the compaction point, if a branch instruction is detected in executing the program code; copy compaction point information from the reconvergence stack for a wavefront to the compaction table; wait for all wavefronts following the same control path to reach the compaction point; determine whether all wavefronts following the same control path in the program code have reached the reconvergence point, if no branch instruction is detected in executing program code; copy the reconvergence stack entry for the reconvergence point to the reconvergence table; wait for all wavefronts following the same control path at the reconvergence point; and repack the dynamic wavefronts with all threads that follow the same control path in the program code, if all wavefronts following the same control path have reached the branch instruction or the reconvergence point.

BRIEF DESCRIPTION OF THE DRAWINGS

A more detailed understanding may be had from the following description, given by way of example in conjunction with the accompanying drawings, wherein:

FIG. 2 is a diagram of a workgroup execution with dynamic wavefronts;

DETAILED DESCRIPTION

A method, a non-transitory computer readable medium, and a processor (also referred to herein as "a processing unit") for repacking dynamic wavefronts during program code execution on a graphics processing unit, each dynamic wavefront including multiple threads are presented. If a branch instruction is detected, a determination is made whether all wavefronts following a same control path in the program code have reached a compaction point, which is the branch instruction. If no branch instruction is detected in executing the program code, a determination is made whether all wavefronts following the same control path have reached a reconvergence point, which is a beginning of a program code segment to be executed by both a taken branch and a not taken branch from a previous branch instruction. The dynamic wavefronts are repacked with all threads that follow the same control path, if all wavefronts following the same control path have reached the branch instruction or the reconvergence point.

Figure 1:
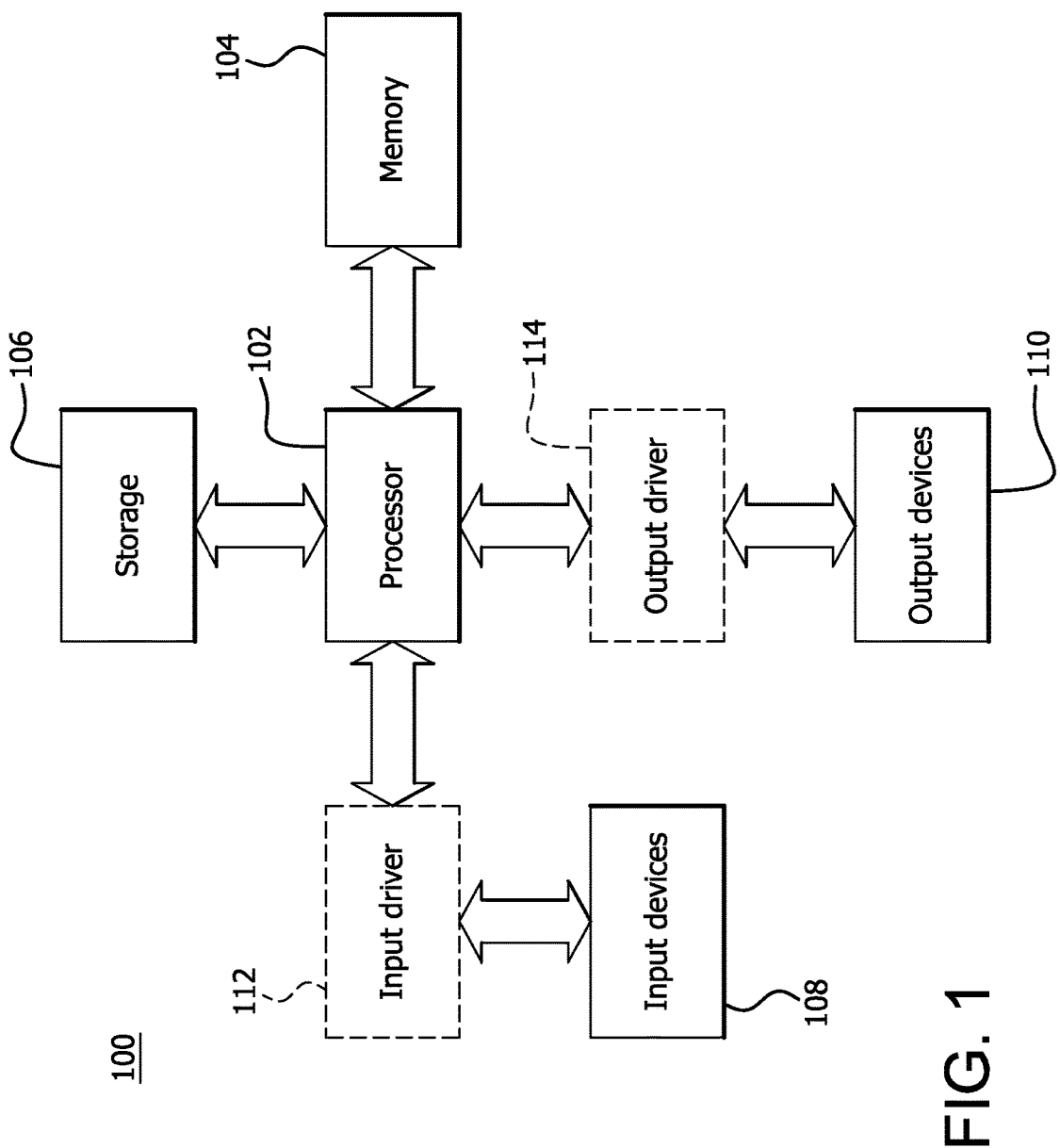
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. Processing cores, CPUs, GPUs, and the like may also be referred to herein as a processing unit. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Dynamic Wavefront Creation

FIG. 2 shows an example execution of a workgroup with dynamic wavefronts. An execution flow 202 is shown, along with a corresponding control flow 204. The execution flow 202 includes several static wavefronts 206 (identified by the prefix "W") and several dynamic wavefronts 208 (identified by the prefix "DWF"). The control flow includes several basic blocks 210 (identified by the prefix "BB"). Several program counter (PC) labels are shown along the left side of FIG. 2, which identify various points of execution during the flow. In this example, the following assumptions are made: the number of wavefronts in a workgroup is four, the maximum number of wavefronts available for scheduling is four, and the scheduler prioritizes a "not taken" path over a "taken" path for scheduling.

At the beginning of execution (PC:A), both the static wavefronts and the dynamic wavefronts have the same threads. All of the static wavefronts start executing BB0 (PC:A) together. When the end of BB0 (PC:B) is reached, there is a divergent branch, such that the flow can take two control flow paths—execute BB1 (PC:C) or execute BB2 (PC:E), which are different control flow paths.

For the GPU, this is a divergence, because some threads in a wavefront may execute BB1 while other threads in the same wavefront execute BB2. If this happens, then the SIMD unit efficiency is decreased because all threads of a wavefront are executed together. If only some of the threads of a wavefront follow a given control flow path, then only those threads will be active, thereby wasting "thread space" in the GPU. This problem is known as the branch divergence problem.

At the divergent branch (PC:B; also referred to as a "compaction point"), all of the wavefronts will wait and will execute the branch (taken or not taken), splitting the control flow into basic blocks BB1 (taken path; PC:C) and BB2 (not taken path; PC:E). Dynamic wavefronts DWF0 and DWF1 are repacked with threads following the taken path; DWF0 includes taken path threads from static wavefronts 0 and 1, and DWF1 includes taken path threads from static wavefronts 2 and 3. DWF2 and DWF3 are repacked with threads following the not taken path; DWF2 includes not taken path threads from static wavefronts 0 and 1, and DWF3 includes not taken path threads from static wavefronts 2 and 3.

Dynamic wavefronts attempt to avoid the branch divergence problem. Idea of dynamic wavefronts in general is to regroup the threads into new wavefronts at every divergent branch. When a dynamic wavefront reaches a branch, a new wavefront is created based on the direction taken with that branch. If the number of threads is greater than the maximum possible number of threads in a wavefront, then multiple wavefronts will be formed. All of the dynamic wavefronts are independent from each other, and can execute in any fashion. This is a decision made by the scheduler.

Continuing with the execution flow, at compaction point F (PC:F), the control flow again diverges, into basic blocks BB3 (taken path; PC:G) and BB4 (not taken path; PC:J). Threads in DWF2 and DWF3 are repacked again at PC:F, with DWF2 including threads following the taken path from all four static wavefronts, and DWF3 including threads following the not taken path from all four static wavefronts.

The threads in DWF2 and DWF3 reconverge at reconvergence point L (PC:L, the beginning of BB5), which means that BB5 will be executed by both branches (taken and not taken) from the previous divergence point (BB2, PC:F). At PC:L, the threads that were repacked at PC:F go back to the wavefront that they were from before they were repacked at PC:F.

When execution reaches BB6 (PC:N), this is another reconvergence point (from the divergence point at PC:B, the end of BB0). Before executing PC N, the threads are all repacked into their original wavefronts (the wavefronts that the threads were in before they diverged at PC:B).

Hybrid Compactor

A hybrid compactor, as described herein, uses a per-wavefront reconvergence stack and per-workgroup compaction and reconvergence tables. The reconvergence stack precisely maintains the reconvergence information needed for proper thread reconvergence. The per-workgroup compaction and reconvergence tables help to synchronize participating wavefronts of a workgroup at compaction or reconvergence points.

Figure 3A:
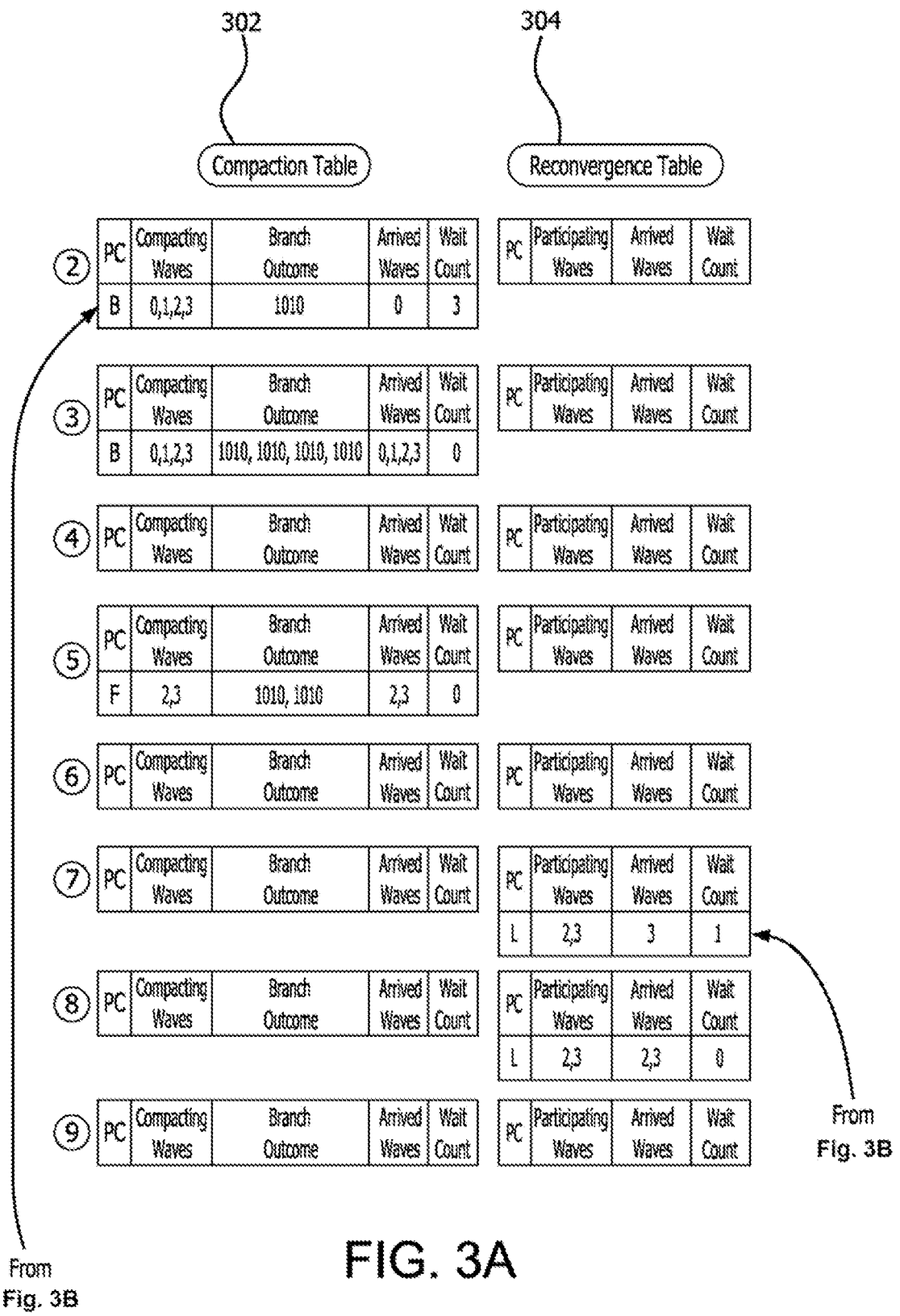
FIGS. 3A and 3B are a diagram of tables used in a dynamic wavefront compactor.
Figure 3B:
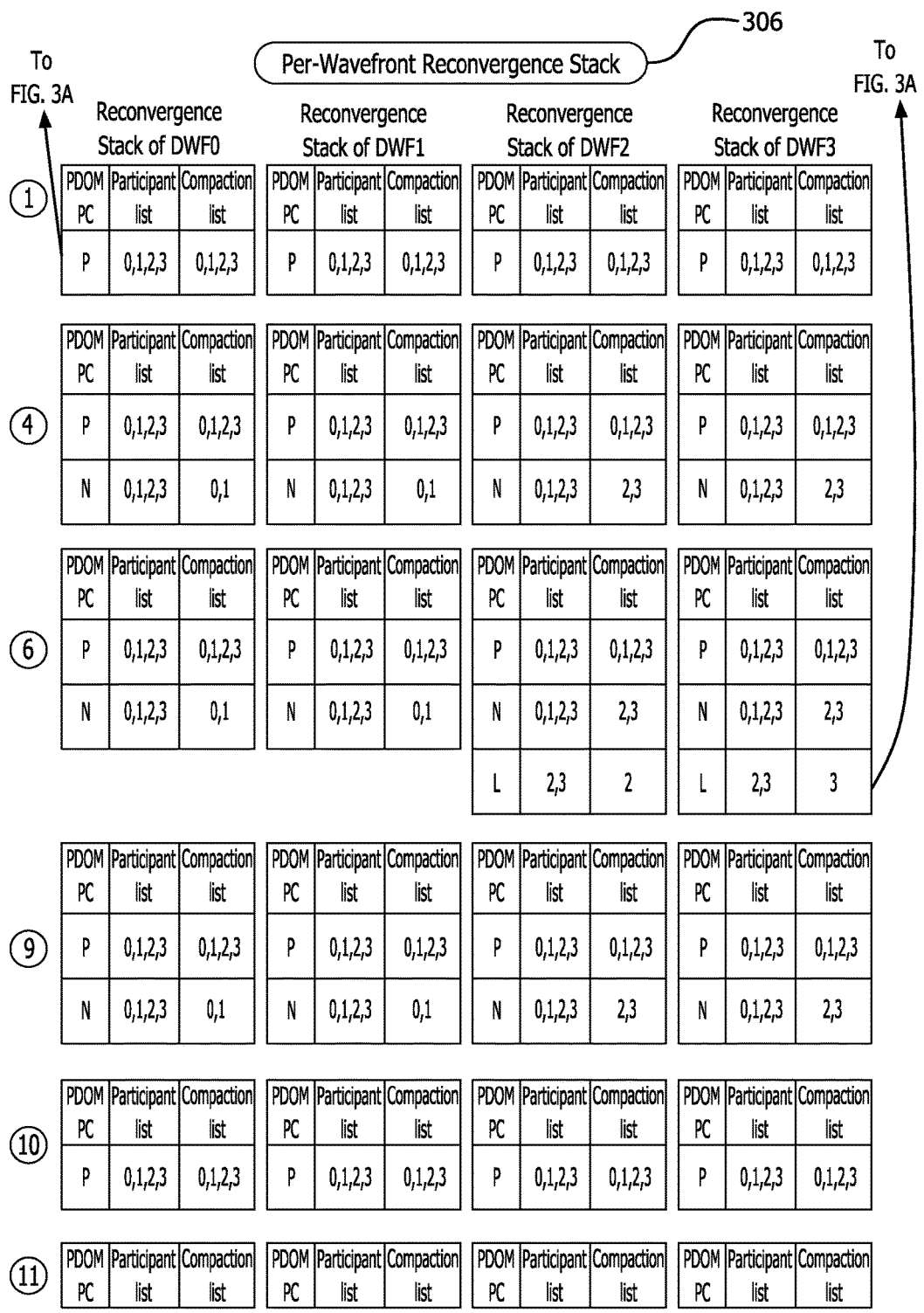

The hybrid compactor is described in terms of the control and execution flows shown in FIG. 2. FIGS. 3A and 3B show a workgroup compactor table 302, a workgroup reconvergence table 304, and per-wavefront reconvergence stacks 306, one stack for each of the dynamic wavefronts. The workgroup compactor table 302, the workgroup reconvergence table 304, and the per-wavefront reconvergence stacks 306 are shown such that the contents at a given point in time (identified by a circled number) can be seen.

Point ① shows the reconvergence stack 306 of all wavefronts initialized. The PDOM PC is the immediate post dominator PC, which is the first instruction in the code that must be executed by all divergent (and still active) threads. The initial stack entry will have the PC of the return instruction (PC:P) as the PDOM PC. The participating waves (in the "Participant list" column) are the wavefronts which will reconverge at the PDOM PC. The waiting waves (in the "Compaction list" column) are the wavefronts which are following the same control path as that of the corresponding wavefront.

All four wavefronts start executing basic block 0 (BB0) and dynamic wavefront 0 (DWF0) reaches compaction point B (PC:B). At compaction point B, DWF0 copies the compaction information from its reconvergence stack 306 to the compaction table 302 and waits for other wavefronts (shown in the compactor table 302 in the "Compacting waves" column) to reach the compaction point ②. The waiting is indicated by the "Arrived waves" column in the compactor table 302, which at point ② indicates that no waves have arrived, and the "Wait count" column, which indicates a number of waves to wait for (shown as three waves at point ②, meaning that DWF0 waits for three other waves to arrive).

When all waves reach compaction point B (point ③), the entry in compaction table 302 is removed and a new reconvergence entry is pushed into the reconvergence stack 306 of all wavefronts (shown by point ④ in both the compaction table 302 and the reconvergence stacks 306). The participant list of the new entry (PC:N) is updated with information for all four wavefronts. The compaction list is only updated with wavefronts following the same control flow. For example, the compaction list of DWF2 for PC:N has only DWF2 and DWF3 that are the wavefronts following the same control path.

Point ⑤ shows the compaction table 302 when both DWF2 and DWF3 reach the compaction point F (PC:F). Since the reconvergence stack 306 has information about the wavefronts which have followed this control path, the wavefronts DWF2 and DWF3 are allowed to make forward progress once both of them arrive at the compaction point F. The workgroup compactor had to stall DWF2 and DWF3 at compaction point F until DWF0 and DWF1 reached reconvergence point N.

Point ⑥ shows DWF2 and DWF3 exiting compaction point F by removing the entry from the compaction table 302 and adding an entry to their respective reconvergence stacks 306 (entry PC:L).

Point ⑦ shows DWF3 reaching reconvergence point L, by adding an entry to the reconvergence table 304 (PC:L, with the arrived waves column indicating that DWF3 has arrived at PC:L). At the reconvergence point L, DWF3 copies the reconvergence information from its reconvergence stack 306 to the reconvergence table 304 and waits at this reconvergence point to synchronize with DWF2.

After DWF2 reaches reconvergence point L (at point ⑧, with the arrived waves column indicating that both DWF2 and DWF3 have arrived at PC:L), both DWF2 and DWF3 pop one entry from their reconvergence stack 306 and make forward progress (point ⑨, removing the entry from the reconvergence table 304 and removing the PC:L entry from the reconvergence stacks 306 of DWF2 and DWF3).

Point ⑩ shows the reconvergence stacks 306 of all wavefronts after they have executed reconvergence point N (removing the PC:N entry) before proceeding towards kernel completion at point ⑪ (removing the PC:P entry from the reconvergence stacks 306).

By using the per-wavefront reconvergence stack as described above, each wavefront can independently move forward with execution. The wavefronts do not have to wait for all of the wavefronts to reach a given reconvergence point to continue. Existing methods of implementing dynamic wavefronts do not use a per-wavefront reconvergence stack, but instead use a single reconvergence stack, such that any one wavefront needs to wait for all of the wavefronts to reach the same convergence point before continuing with executing the flow.

At any branch point (compaction point), all wavefronts following the same control path wait for the other wavefronts on the control path to reach that point, so there will be a sufficient number of threads to repack. Without waiting at the compaction point, there will not be a large enough number of threads following the same control flow path to maximize throughput, because not all available threads would be active, leading to having a partially filled wavefront. To maximize throughput, it is preferable to have a completely full wavefront or multiple completely filled wavefronts.

To be able to completely fill a wavefront, there needs to be more than one wavefront at the compaction point, because not all of the threads of a single wavefront will follow the same control flow path. At every branch point, the wavefronts wait for all other wavefronts in the same workgroup to reach the branch. With more wavefronts at the same point, there is more opportunity to repack the threads to completely fill a dynamic wavefront.

The compaction list in the per-wavefront reconvergence stack 306 tracks the dynamic wavefronts that are following the same control flow path. If a wavefront reaches another branch instruction, by looking at the compaction list, the wavefront knows which other wavefronts that it should wait for. A wavefront will wait for all of the wavefronts in the compaction list to reach the same branch instruction. After all of the wavefronts have reached the same branch instruction, the threads will be repacked to form a new wavefront.

If there is no compaction list, the wavefront does not know the other wavefronts that it should wait for to be able to repack the threads.

The participant list in the per-wavefront reconvergence stack 306 is used to identify which wavefronts need to reach the reconvergence point (i.e., synchronize the wavefronts at the reconvergence point) before any of the wavefronts can make further forward progress.

With the compaction list and the participant list, a stack can be maintained which will not create unnecessary stalls because the wavefront knows when it has to wait for other wavefronts. If only one reconvergence stack for the entire workgroup is maintained, then there will not be an opportunity to overlap the taken and not taken paths simultaneously. Because only one BB is executed at a time, whichever BB is at the top of the single reconvergence stack will be executed. But if each wavefront has its own reconvergence stack, each wavefront can individually execute its own BB.

The existing single reconvergence stack will not work for dynamic wavefronts, because they lack the compaction list and the participant list. The existing reconvergence stack does not support regrouping of the threads, and only works with static wavefronts. With static wavefronts, there will not be any thread repacking when a branch instruction is reached, so there will be inactive threads in the wavefront.

When the dynamic wavefronts reconverge, the individual work-items are placed back into their initial "static" locations (or at least closer to them, in the case of intermediate reconvergence points). The benefit of doing so is it allows the wavefronts to preserve their initial memory access patterns, which often are more optimized than the dynamic wavefront organizations. For example, adjacent work-items in static wavefronts tend to access adjacent memory locations, which allows for good memory coalescing. Meanwhile, adjacent work-items in dynamic wavefronts do not tend to do so. By attempting to reconverge divergent wavefronts as quickly as possible, the amount of memory coalescing may be maximized.

Figure 4:
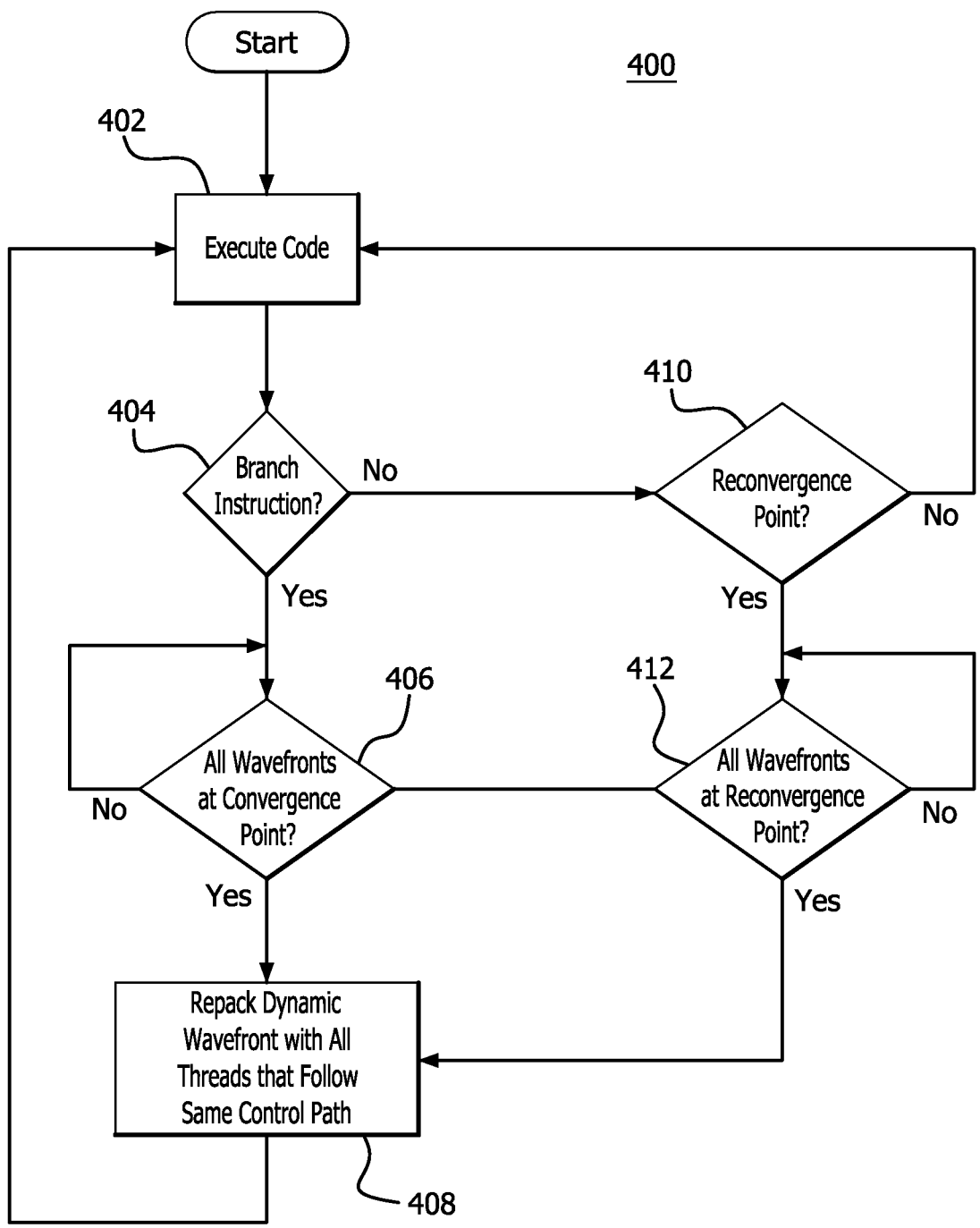
FIG. 4 is a flowchart of a method for repacking a dynamic wavefront.

FIG. 4 is a flowchart of a method 400 for repacking a dynamic wavefront. The method 400 begins with code being executed (step 402), which can include execution of multiple threads across multiple wavefronts. During code execution, a determination is made whether a branch instruction is reached (step 404). If a branch instruction is reached, then a determination is made whether all wavefronts following the same control path have reached the compaction point (branch instruction; step 406). If not, then the method 400 waits until all wavefronts have reached the compaction point. After all wavefronts have reached the compaction point, the dynamic wavefronts are repacked with all threads that are following the same control path (step 408). The method then continues executing the code (step 402).

If a branch instruction is not reached (step 404), then a determination is made whether a reconvergence point has been reached (step 410). If a reconvergence point has not been reached, then the method continues executing the code (step 402). If a reconvergence point has been reached, then a determination is made whether all wavefronts following the same control path have reached the reconvergence point (step 412). If not, then the method 400 waits until all wavefronts have reached the reconvergence point. After all wavefronts have reached the reconvergence point, the dynamic wavefronts are repacked with all threads that are following the same control path (step 408). The method then continues executing the code (step 402).

Figure 5:
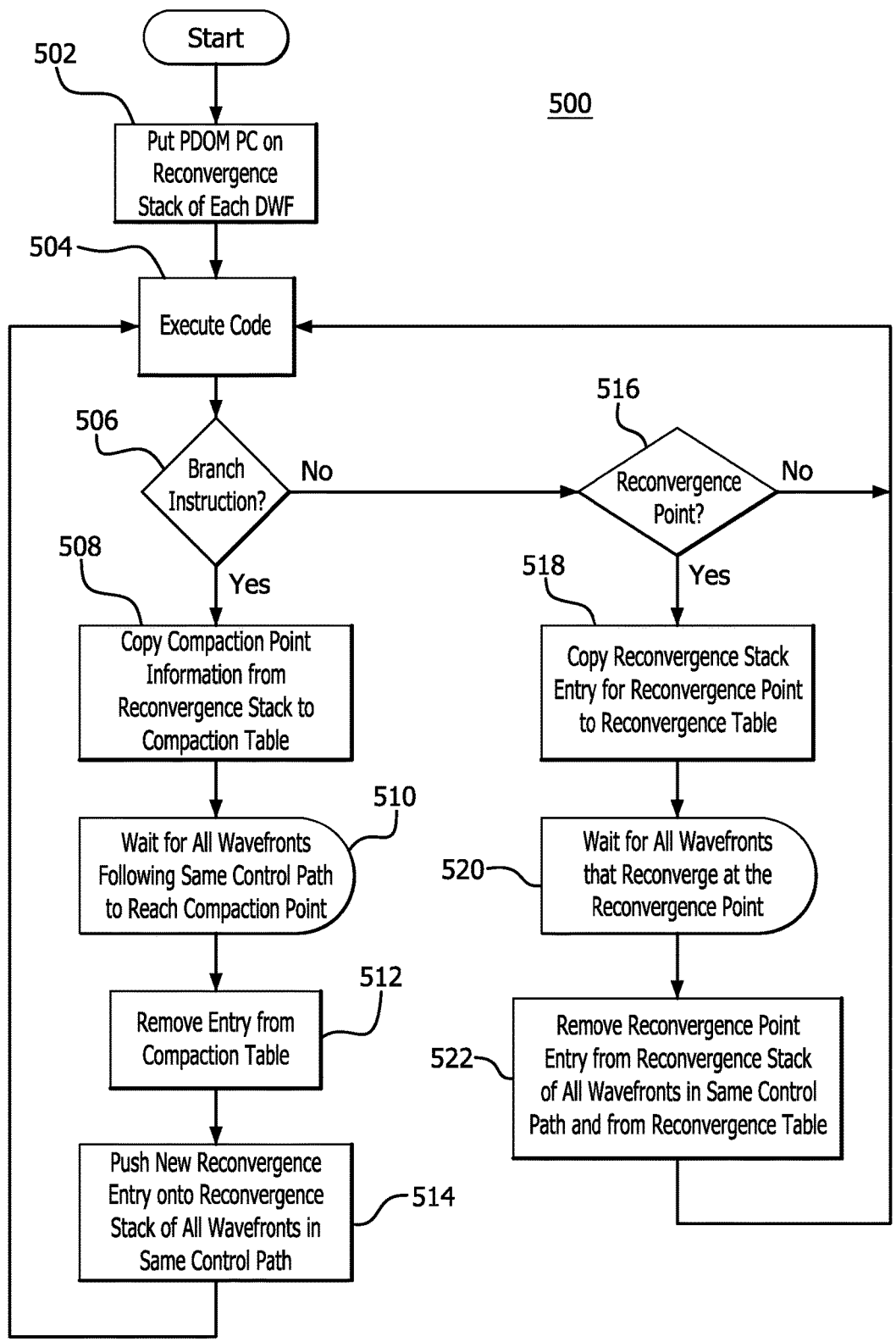
FIG. 5 is a flowchart of one implementation of a method of repacking a dynamic wavefront.

FIG. 5 is a flowchart of a method 500 showing one implementation of repacking a dynamic wavefront. The method 500 begins by putting the PDOM PC on the reconvergence stack of each dynamic wavefront (DWF; step 502). The code is executed (step 504), which includes execution of multiple threads across multiple wavefronts. During code execution, a determination is made whether a branch instruction is reached (step 506). If a branch instruction is reached, then the compaction point (branch instruction) information is copied from the reconvergence stack to a compaction table (step 508). The method waits for all wavefronts that follow the same control flow path to reach the compaction point (step 510). Once all wavefronts in the control flow path have reached the compaction point, the compaction point entry is removed from the compaction table (step 512). A new reconvergence entry (where the branch would end) is pushed onto the reconvergence stack of all wavefronts in the same control flow path (step 514). The method then continues executing the code (step 504).

If a branch instruction is not reached (step 506), then a determination is made whether a reconvergence point has been reached (step 516). If a reconvergence point has not been reached, then the method continues executing the code (step 504). If a reconvergence point has been reached, then the reconvergence stack entry for the reconvergence point is copied to a reconvergence table (step 518). The method waits for all wavefronts that reconverge at the reconvergence point (step 520). Once all wavefronts in the control flow path have reached the reconvergence point, the reconvergence point entry is removed from the reconvergence stack of all wavefronts in the control flow path and from the reconvergence table (step 522). The method then continues executing the code (step 504).

Figure 6:
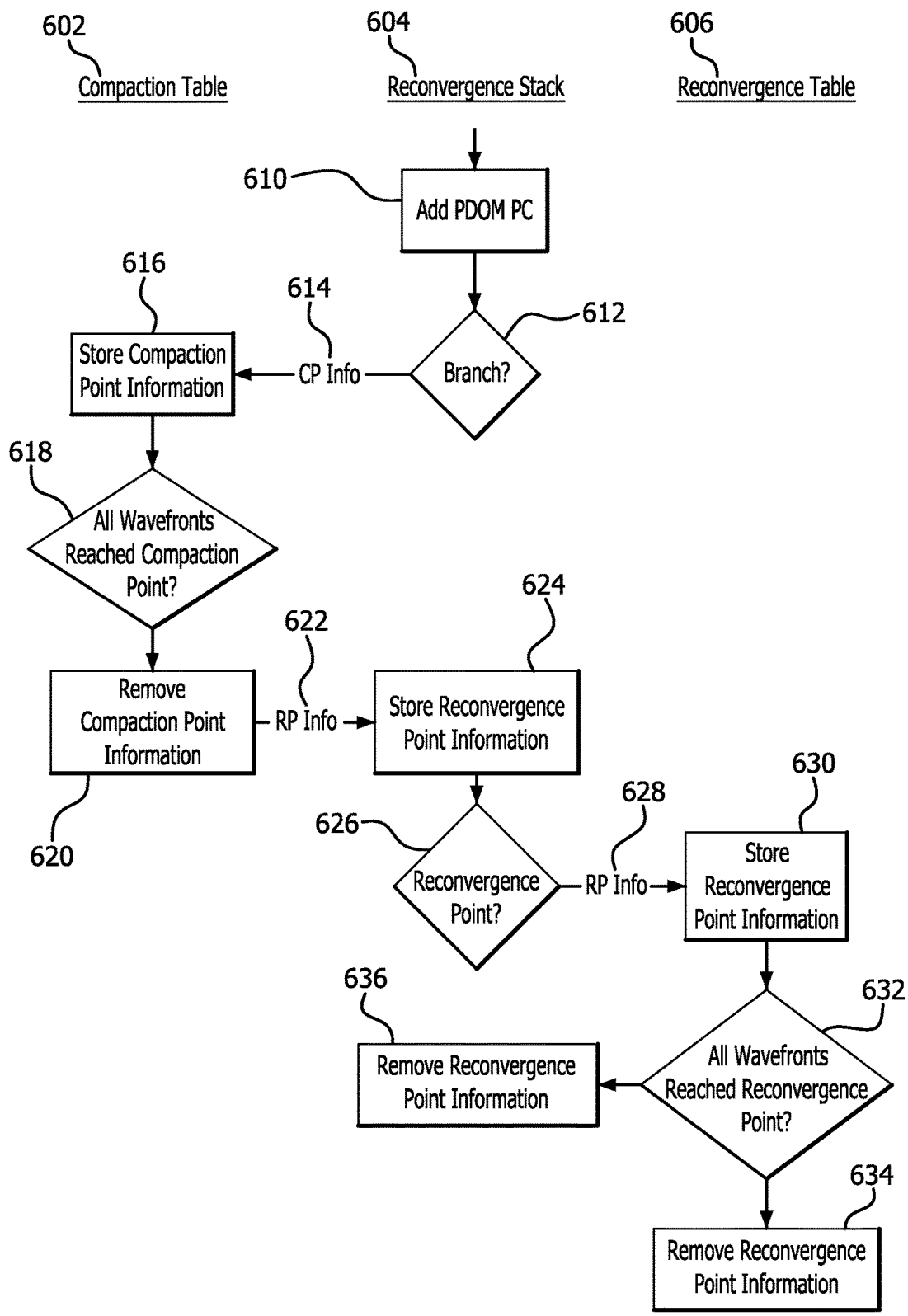
FIG. 6 is a flow diagram showing the interactions between different information storing entities during the method of FIG. 5.

FIG. 6 is a flow diagram showing the interactions between different information storing entities during the method of FIG. 5. The interactions are between a compaction table 602, a reconvergence stack 604, and a reconvergence table 606. To simplify explanation, the following description relates to one reconvergence stack 604, but the description is equally applicable to multiple reconvergence stacks 604. It is also noted that the compaction table 602, the reconvergence stack 604, and the reconvergence table 606 may be implemented in software or in hardware; this is an implementation choice.

The PDOM PC is added to the reconvergence stack 604 (step 610). A determination is made whether a branch instruction has been reached (step 612). It is noted that while step 612 is shown under the reconvergence stack 604, this determination is made by the code and not by the reconvergence stack 604. If there is a branch instruction, the compaction point (CP) information (i.e., the information relating to the branch instruction) is copied from the reconvergence stack 604 to the compaction table 602 (step 614) and is stored in the compaction table 602 (step 616).

A determination is made whether all of the wavefronts following the same control flow path have reached the compaction point (step 618). It is noted that while step 618 is shown under the compaction table 602, this determination is made by the code and not by the compaction table 602. Once all of the wavefronts in the control flow path have reached the compaction point, the compaction point information is removed from the compaction table 602 (step 620). Information about the reconvergence point (RP) is copied from the compaction table 602 to the reconvergence stack 604 (step 622) and is stored on the reconvergence stack 604 (step 624).

A determination is made whether a reconvergence point has been reached (step 626). It is noted that while step 626 is shown under the reconvergence stack 604, this determi- nation is made by the code and not by the reconvergence stack 604. If a reconvergence point has been reached, then the reconvergence point information is copied to the reconvergence table 606 (step 628) and is stored in the reconvergence table 606 (step 630).

A determination is made whether all of the wavefronts reconverging at that reconvergence point have reached the reconvergence point (step 632). It is noted that while step 632 is shown under the reconvergence table 606, this determination is made by the code and not by the reconvergence table 606. Once all of the wavefronts in the control flow path have reached the reconvergence point, the reconvergence point information is removed from the reconvergence table 606 (step 634) and from the reconvergence stack 604 (step 636).

A thread in a static wavefront executes on the same SIMD hardware lane (hereafter called a "SIMD lane") throughout its execution. The execution context of a thread is stored in register columns of a vector register file and each register column is associated with a SIMD lane. While creating a dynamic wavefront, a thread may migrate from its source SIMD lane to a new destination SIMD lane after repacking. Consequently, the execution context of the thread needs to migrate from the source register column to a destination register column. This can be achieved in multiple ways. For example, the register file structure may be changed, including by multi-pumping, multi-porting, or using a register crossbar for assisting thread context migration. A multi-ported register file can supply multiple operands in a single cycle from a register column which can be then routed to the appropriate SIMD lane with the help of a register crossbar.

The dynamic wavefront creation techniques described herein may work with the thread context migration technique and register file changes described above.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for repacking dynamic wavefronts, the method comprising:
   executing, by a processor, program code that includes a plurality of threads in a plurality of wavefronts, wherein the processor includes reconvergence stacks for each of the plurality of wavefronts;
   identifying dynamic wavefronts from the plurality of wavefronts that follow a same control path in the program code;
   detecting if a branch instruction is included in a particular wavefront from the dynamics wavefronts;
   if a branch instruction is detected in the particular wavefront:
      copying compaction point information from a particular reconvergence stack of the particular wavefront to a compaction table,
      determining whether all of the dynamic wavefronts have reached a compaction point, wherein the compaction point is the branch instruction, and
      waiting for all dynamic wavefronts to reach the compaction point;
   if no branch instruction is detected in the particular wavefront:
      determining whether all of the dynamic wavefronts have reached a reconvergence point, wherein the reconvergence point is a beginning of a program code segment to be executed by both a taken branch and a not taken branch from a previous branch instruction; and
   repacking all of the threads of the dynamic wavefronts if all of the dynamic wavefronts have reached the branch instruction or the reconvergence point.

2. The method according to claim 1, wherein the repacking includes:
   removing the compaction point information from the compaction table; and
   pushing a new reconvergence point entry onto each reconvergence stack of each respective dynamic wavefront.

3. The method according to claim 1, wherein determining whether all of the dynamic wavefronts have reached the reconvergence point includes:
   copying a reconvergence stack entry for the reconvergence point to a reconvergence table; and
   waiting for all of the dynamic wavefronts to reach the reconvergence point.

4. The method according to claim 3, wherein the repacking includes:
   removing the reconvergence entry for the reconvergence point from each reconvergence stack of each respective dynamic wavefront and from the reconvergence table.

5. The method according to claim 1, further comprising:
   pushing a post dominator program counter onto each reconvergence stack of each respective wavefront, wherein the post dominator program counter is a program counter for a first instruction executed by all active threads.

6. A non-transitory computer-readable storage medium storing a set of instructions for execution by a processor to repack dynamic wavefronts, the set of instructions when executed by the processor cause the processor to:
   execute program code that include a plurality of threads in a plurality of wavefronts;
   identify dynamic wavefronts from the plurality of wavefronts that follow a same control path in the program code, wherein the processor includes reconvergence stacks for each of the plurality of wavefronts;

detects if a branch instruction is included in a particular wavefront from the dynamics wavefronts;

if a branch instruction is detected in the particular wavefront:
copies compaction point information from a particular reconvergence stack of the particular wavefront to a compaction table,
determines whether all of the dynamic wavefronts have reached a compaction point, wherein the compaction point is the branch instruction, and
waiting for all dynamic wavefronts to reach the compaction point;

if no branch instruction is detected in the particular wavefront:
determines whether all of the dynamic wavefronts have reached a reconvergence point, wherein the reconvergence point is a beginning of a program code segment to be executed by both a taken branch and a not taken branch from a previous branch instruction; and repackages all threads of the dynamic wavefronts that have reached the branch instruction or the reconvergence point.

7. The non-transitory computer-readable storage medium according to claim 6, wherein the processor repackages all of the dynamic wavefronts by:
removing the compaction point information from the compaction table; and
pushing a new reconvergence point entry onto each reconvergence stack of each respective dynamic wavefront.

8. The non-transitory computer-readable storage medium according to claim 6, wherein the processor determines whether all of the dynamic wavefronts have reached the reconvergence point by:
copying a reconvergence stack entry for the reconvergence point to the reconvergence table; and
waiting for all of the dynamic wavefronts to reach the reconvergence point.

9. The non-transitory computer-readable storage medium according to claim 8, wherein the repacking includes:
removing the reconvergence stack entry for the reconvergence point from each reconvergence stack of each respective dynamic wavefront and from the reconvergence table.

10. The non-transitory computer-readable storage medium according to claim 6, further comprising instructions that cause the processor to:
push a post dominator program counter onto each reconvergence stack of each respective wavefront, wherein the post dominator program counter is a program counter for a first instruction executed by all active threads.

11. A processor configured to repack dynamic wavefronts during program code execution, the processor comprising:
a compaction table, configured to store compaction point information, wherein the compaction point is a branch instruction;
a reconvergence stack for each of a plurality of wavefronts, each reconvergence stack configured to store compaction point information for each respective wavefront;
a reconvergence table, configured to store reconvergence point information, wherein the reconvergence point is a beginning of a program code segment to be executed by both a taken branch and a not taken branch from a previous branch instruction;
wherein the processor is configured to:
execute program code that include a plurality of threads in the plurality of wavefronts, wherein the processor includes reconvergence table for each of the plurality of wavefronts;
identify dynamic wavefronts from the plurality of wavefronts that follow a same control path in the program code;
detect if the branch instruction is included in a particular wavefront from the dynamic wavefronts;
determine whether all of the dynamic wavefronts have reached the compaction point, if the branch instruction is detected in the particular wavefront;
copy compaction point information from a particular reconvergence stack of the particular wavefront to the compaction table;
wait for all of the dynamic wavefronts to reach the compaction point;
determine whether all of the dynamic wavefronts have reached the reconvergence point, if no branch instruction is detected in the particular wavefront;
copy the reconvergence stack entry for the reconvergence point to the reconvergence table;
wait for all of the dynamic wavefronts to reach the reconvergence point; and
repack all of the threads of the dynamic wavefronts if all of the dynamic wavefronts have reached the branch instruction or the reconvergence point.

12. The processor according to claim 11, wherein the processor is further configured to:
remove the compaction point information from the compaction table; and
push a new reconvergence point entry onto each reconvergence stack of each respective dynamic wavefront.

13. The processor according to claim 11, wherein the processor is further configured to:
remove the reconvergence point entry from each reconvergence stack of each respective dynamic wavefront and from the reconvergence table.

14. The processor according to claim 11, wherein the processor is further configured to:
push a post dominator program counter onto each respective reconvergence stack of each respective dynamic wavefront, wherein the post dominator program counter is a program counter for a first instruction executed by all active threads.

* * * * *